United States Patent [19]

Riley et al.

[11] 4,243,701

[45] Jan. 6, 1981

[54] PREPARATION OF GAS SEPARATION MEMBRANES

[75] Inventors: Robert L. Riley, La Jolla; Richard L. Grabowsky, Bakersfield, both of Calif.

[73] Assignee: UOP Inc., Des Plaines, Ill.

[21] Appl. No.: 92,382

[22] Filed: Nov. 8, 1979

Related U.S. Application Data

[63] Continuation-in-part of Ser. No. 31,910, Apr. 20, 1979, abandoned, which is a continuation-in-part of Ser. No. 855,096, Nov. 25, 1977, abandoned.

[51] Int. Cl.$^3$ .............................................. B05D 5/00
[52] U.S. Cl. ...................................... 427/244; 55/158; 264/41; 264/46.4; 264/DIG. 18; 427/430.1; 427/439
[58] Field of Search ................. 264/41, 46.4, DIG. 18; 210/500 M; 55/158; 427/244, 246, 430.1, 439

[56] References Cited

U.S. PATENT DOCUMENTS

| | | | |
|---|---|---|---|
| 2,540,152 | 2/1951 | Weller | 55/16 |
| 2,966,235 | 12/1960 | Kammermeyer | 55/16 |
| 3,274,750 | 9/1966 | Robb | 55/16 |
| 3,415,038 | 12/1968 | Merten et al. | 55/16 |
| 3,526,588 | 9/1970 | Michaels et al. | 210/500 M X |
| 3,580,841 | 5/1971 | Cadotte et al. | 210/490 X |
| 3,648,845 | 3/1972 | Riley | 210/490 |
| 3,657,113 | 4/1972 | Stancell et al. | 210/490 X |
| 3,754,375 | 8/1973 | Bouchilloux et al. | 55/16 |
| 3,767,737 | 10/1973 | Lundstrom | 55/158 X |
| 3,892,665 | 7/1975 | Steigelmann et al. | 210/490 |

*Primary Examiner*—Evan K. Lawrence
*Attorney, Agent, or Firm*—James R. Hoatson, Jr.; Raymond H. Nelson; William H. Page, II

[57] ABSTRACT

Membranes, which may be used for the separation of gases, comprise a thin film of a semi-permeable material composited on a porous support member. The membranes are prepared by passing a support member through a solution of a halogenated hydrocarbon solvent containing a semi-permeable membrane forming prepolymer and cross-linking agent. This step is then followed by the cross-linking of the prepolymer by treatment at an elevated temperature. The process may be exemplified by passing one finely porous surface of a cellulose nitrate-cellulose acetate support member through a solution of dimethyl silicone in a halogenated solvent such as trifluorotrichloroethane followed by treatment at a temperature in the range of from about 50° to about 150° C. to form the desired membrane.

11 Claims, No Drawings

PREPARATION OF GAS SEPARATION MEMBRANES

CROSS-REFERENCE TO RELATED APPLICATIONS

This application is a continuation-in-part of our copending application Ser. No. 31,910 filed Apr. 20, 1979, abandoned, which is a continuation-in-part of copending application Ser. No. 855,096 filed Nov. 25, 1977 and now abandoned, all teachings of which are incorporated herein by reference thereto.

BACKGROUND OF THE INVENTION

This invention relates to a process for preparing membranes which are applicable for the separation of various gases from a mixture thereof.

The use of semi-permeable membranes for reverse osmosis or ultrafiltration processes is well known. For example, in a reverse osmosis process, high pressure saline water may be placed in contact with a semipermeable membrane which is permeable to water but relatively impermeable to salt. Concentrated brine and relatively pure water are separated thereby; the water may then be utilized for personal use such as drinking, cooking, etc.

It has now been discovered that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

This ability to separate gases from a mixture stream will find many applications in commercial uses. For example, gas separation systems may be used for oxygen enrichment of air, for improved combustion efficiencies and conservation of energy resources. Likewise, nitrogen enrichment of air may be applicable where inert atmospheres are required. Other applications for oxygen enriched gases may be improving selectivity and efficiency of chemical and metallurgical processes. Similarly, inert atmospheres such as may be provided for by this invention may also be utilized in chemical and metallurgical processes. Some other applications of gas separation would include helium recovery from natural gas, hydrogen enrichment in industrial process applications, and scrubbing of acid gases. Specific uses for oxygen enrichment of air would be breathing systems for submarines and other underwater stations, improved heart-lung machines, and other lung assist devices. Another specific application of a gas separation system would be an aircraft to provide oxygen enrichment for life-support systems and nitrogen enrichment for providing an inert atmosphere for fuel systems. In addition, gas separation systems may be used for environmental benefits, e.g., methane can be separated from carbon dioxide in waste gases for sewage treatment processes and oxygen enriched air can be produced to enhance sewage digestion.

Some thin film polymers have been reported in the literature. For example, U.S. Pat. No. 3,892,655 discloses a membrane and a method for producing these membranes. In this patent a thin polymer film is formed on the surface of a liquid, generally water, and is subsequently transferred to the surface of a porous supporting membrane. During the transfer of the thin polymer film, the porous support is maintained in a wetted stage with the liquid. In addition, the thin film can also be formed on the surface of the porous membrane if the surface of the support is first wet with the transfer liquid. This then means that the pores of the support member must be filled with liquid and, therefore, the liquid must be removed from the porous support at a period subsequent to the formation of the film in order to draw the film onto the support. In general, the thin polymer film of the reference consists of a monomolecular layer which is formed on the surface of the water wherein the individual film forming monomer and/or polymer chains are oriented and closely packed. Subsequently, the oriented monomolecular layer or film, which is limited to a thickness in the range of from about 5 to about 25 Angstroms is transferred to the surface of the porous support membrane. This process may be repeated until multiple monolayers are deposited on the surface of the support, the total film thickness then being from about 10 to about 200 Angstroms. Other than Van Der Vaal's forces, there is no bonding between the aggregate layers and the support. This means that the thin film of the finished membrane is weakly attached to the porous support and said membrane cannot withstand substantial back pressure when in operation. Obviously, this process is tedious and expensive and is not readily amenable to commercial use.

Another U.S. Pat., namely, No. 3,526,588 discloses a macromolecular fractionation process and describes a porous ultrafiltration membrane which is selective on the basis of pore size. In contradistinction to this, it is essential that the thin film membrane which is produced according to the process of the present invention is non-porous, so that gas separation operates by a diffusion-solution mechanism of transport. U.S. Pat. No. 3,767,737 which discloses a method for producing casting of "ultra-thin" polymer membranes is similar in nature to U.S. Pat. No. 3,892,665 in that the thin film of the membrane is formed on the surface of a liquid and transferred to the surface of a porous support membrane. The thin film polymer will thus inherently possess a disadvantage ascribed to the membrane of the former patent in that it cannot withstand substantial back pressure when in operation. Actually, the films described in U.S. Pat. No. 3,767,731, as judged by the examples are relatively thick, being in the range of 0.4 to 1.3 microns (4000 to 13,000 Angstroms). In addition, U.S. Pat. No. 2,966,235 discloses a separation of gases by diffusion through silicone rubber which is not composited on a porous support material.

As hereinbefore set forth the separation of various gases from a mixture thereof may constitute an important advance in commercial applications. This is becoming increasingly important in view of the necessity to conserve energy. A particular application would relate to increasing the thermal efficiency of combustion processes when utilizing fossil fuels in commercial combustion applications. Also, by utilizing a gas separation membrane in coal gasification, it may be possible to provide an oxygen enrichment of air for the production of low and medium British thermal unit (BTU) product gases as well as an oxygen enrichment of air for the combustion of these gases. For example, by placing a gas membrane separation system in close proximity to both gas production and gas combustion facilities, it would allow a site-located oxygen enrichment plant to supply both processes without the additional expense of transporting the gas or duplicating enrichment facilities.

SUMMARY OF THE INVENTION

It is therefore an object of this invention to provide a process for preparing membranes which are utilized in the separation of gases.

A further object of this invention is to provide a process for the preparation of membranes which comprise a thin film of a semi-permeable material composited on a porous support member, said membranes being utilized for the separation of various gas components contained in a mixture thereof.

In one aspect an embodiment of this invention resides in a process for the production of a membrane for the separation of gases which comprises forming a thin film of a semi-permeable membrane having a thickness in the range of from about 250 Angstroms to about 10,000 Angstroms directly on the surface of a porous support member by passing one finely porous surface of said porous support member through a solution of a halogenated hydrocarbon solvent containing a semi-permeable membrane forming prepolymer and a cross-linking agent, withdrawing the coated porous support member from said solution, thereafter cross-linking said prepolymer by treatment at an elevated temperature, and recovering the resultant membrane comprising a porous support member coated with a thin film of a semi-permeable membrane.

A specific embodiment of this invention is found in a process for the production of a semi-permeable membrane for the separation of gases which comprises passing one finely porous surface of a cellulose nitrate-cellulose acetate support member through a solution of trifluorotrichloroethane containing dimethyl silicone and a cross-linking agent, withdrawing the coated cellulose nitrate-cellulose acetate support member from said trifluorotrichloroethane solution, thereafter cross-linking the dimethyl silicone polymer by treatment at a temperature in the range of from about 50° to about 150° C. and recovering the resultant membrane comprising a cellulose nitrate-cellulose acetate support member coated with a thin film of polymerized dimethyl silicone.

DETAILED DESCRIPTION

Other objects and embodiments will be found in the following further detailed description of the present invention.

As hereinbefore set forth the present invention is concerned with the process for producing a thin film membrane which may be utilized for the separation of gases, said membrane consisting of a thin semi-permeable barrier composited on a finely porous support member. By utilizing a thin imperfection-free semi-permeable barrier which has been prepared from a prepolymeric material as hereinafter set forth in greater detail, the selected gas or gases will pass through the barrier with little hindrance while other gases will be less able to penetrate the barrier. In the preferred embodiment of the invention, the thin film, semi-permeable barrier will possess a thickness ranging from about 250 to about 10,000 Angstroms, the preferred thickness being from about 250 to about 500 Angstroms. As will be more fully discussed in subsequent portions of the specification, the thickness of the film may be controlled by the concentration of the polymeric film forming material in the solution, as well as the rate of withdrawal of the porous support member from the solution. The thin film barrier of the present invention is formed by utilizing a prepolymer as the membrane forming material. The term "prepolymer" as utilized in the present specification and appended claims is defined as a compound including monomers, prepolymers and polymers which may be of relatively low molecular weight or relatively high molecular weight and which possessed a capability of further coupling and/or cross-linking. Examples of semi-permeable membrane forming prepolymers which may be employed in the process of the present invention will include silicone containing compounds such as dimethyl silicone, silicone-carbonate copolymers, fluorinated silicones, etc., polystyrene, polycarbonates, polyphenylene oxides, polyurethanes, styrene-butadiene copolymers, polyarylethers, ethylene vinyl-acetate copolymers, vinyl polymers and copolymers, epoxides, ethyl cellulose, cellulose acetate, mixed cellulose esters, cellulose nitrate, ABS (acrylonitrile butadiene-styrene), malamine formaldehyde, acrylics, etc., and blends, grafts, blocks and interpolymers of such units.

The aforementioned semi-permeable membrane forming prepolymer is composited on a finely porous support membrane such as polysulfone, cellulose nitrate-cellulose acetate, etc., which may, if so desired, be impregnated on a natural fabric such as canvas, cotton, linen, or a synthetic fabric such as dacron, nylon, orlon, etc. The finely porous support member or membrane will, in the present embodiment of the invention, possess a thickness ranging from about 50 to about 200 microns.

Examples of gas membranes of the present invention will include dimethyl silicone composited on a cellulose nitrate/cellulose acetate support, silicone-carbonate copolymer composited on a cellulose nitrate/cellulose acetate support, polystyrene composited on a cellulose nitrate/cellulose acetate support, polycarbonate composited on a cellulose nitrate/cellulose acetate support, cellulose acetate composited on a cellulose nitrate/cellulose acetate support, polyphenylene oxide composited on a cellulose nitrate/cellulose acetate support, ethyl cellulose composited on a cellulose nitrate/cellulose acetate support, polyamide composited on a cellulose nitrate/cellulose acetate support, cellulose acetate butyrate composited on a cellulose nitrate/cellulose acetate support, dimethyl silicone composited on a polysulfone support, silicone-carbonate composited on a polysulfone support, polystyrene composited on a polysulfone support, polycarbonate composited on a polysulfone support, cellulose acetate composited on a polysulfone support, polyphenylene oxide composited on a polysulfone support, ethyl cellulose composited on a polysulfone support, polyamide composited on a polysulfone support, cellulose acetate butyrate composited on a polysulfone support, etc. It is to be understood that the aforementioned list of semi-permeable membrane forming prepolymers, finely porous support membranes, and gas membranes are only representative of the types of compounds which may be used and the membranes formed in the present invention, and that said invention is not necessarily limited thereto.

The membranes for the separation of gases of the present invention are prepared by forming the very thin layer of polymer directly on the finely porous surface of the supporting member or membrane by passing one surface of the latter through a solution which contains the semipermeable membrane forming prepolymer. As hereinbefore set forth, the thickness of the film, which is preferably in a range of from about 250 to about 500 Angstroms is controlled by the concentration of the polymer forming prepolymer in the solution as well as the rate of withdrawal from the solution. By utilizing this method of asymmetric membrane preparation it is possible to achieve several additional degrees of freedom beyond that which is possible when preparing a membrane according to more conventional methods. Some examples of these advantages will include an independent selection of materials from which to prepare the thin semi-permeable barrier and the finely porous supporting membrane; an independent preparation of the thin film and the porous supporting membrane whereby it is possible to optimize each component for its specific function; a reproductive variation and control over the thickness of the thin film or semipermeable barrier which is required to attain the theoretical maximum in performance; control over the porosity and perfection of the thin semipermeable barrier that is necessary to attain the theoretical semi-permeability of the material, and the formation of the film directly on the finely porous surface of the support whereby said film is integrally bonded to the support membrane, thus permitting the finished membrane to withstand any back pressure which may be encountered.

The finely porous support membrane which is utilized as one component of the gas membrane of the present invention may be prepared by casting the support on a casting machine from a solution which contains the support material such as cellulose nitrate and cellulose acetate as well as solvents such as organic materials including ketones such as acetone, methyl ethyl ketone, diethyl ketone, methyl propyl ketone, etc., alcohols such as methyl alcohol, ethyl alcohol, n-propyl alcohol, isopropyl alcohol, n-butyl alcohol, etc., and surfactants to increase the wettability of the components of the solution. The solution, after blending the various components thereof, is filtered to remove any foreign material by passing through a filter medium under superatmospheric pressure usually afforded by the presence of nitrogen, and thereafter is degassed to remove any dissolved inert gas, such as nitrogen. The solution is fed onto the casting belt and spread on said belt at a desired thickness by means for controlling the thickness such as a casting knife. The freshly cast solution is carried on the belt into a gelation chamber which is maintained at a slightly elevated temperature in the range of from about 30° to about 40° C. After passage through this first gelation chamber wherein the surface pores size and permeability of the membrane is controlled, the belt and support membrane are passed into a second gelation chamber in which the properties of the membrane are fixed. The temperature of the second gelation chamber is higher than that of the first gelation chamber in order to promote the removal of the solvents which may be present. After passing from the second gelation chamber the membrane is removed from the casting belt and passed to storage. The gas membrane of the present invention is then prepared by passing one of the finely porous surfaces of the support membrane through a solution which contains the semipermeable membrane forming prepolymer and a cross-linking agent. In the preferred embodiment of the present invention the prepolymer is dissolved in an organic solvent and preferably a halogenated hydrocarbon compound such as chloroform, iodoform, bromoform, carbon tetrachloride, carbon tetraiodide, carbon tetrabromide, tetrachloroethane, tetrabromoethane, difluorodichloroethane, trifluorotrichloroethane, etc. The particular halogenated organic solvent which is to be employed in the process of this invention will comprise the type of solvent which will dissolve the thin semi-permeable membrane forming prepolymer but will not be of the type which will dissolve or solubilize the support membrane. Thus it is apparent that the particular solvent used will depend upon both the prepolymer and support membrane which are to be employed. Examples of cross-linking agents which may be employed and which may be present in the solution will include toluene diisocyanate, isophthaloyl chloride, etc. The semi-permeable membrane forming prepolymer is usually present in the solution in a range of from about 0.5 wt. % to about 1.0 wt. % of the solution, the amount of prepolymer present in the solution being dependent upon the desired thickness of the thin film to be prepared. After passage through this solution the coated finely porous support membrane containing the mixture of prepolymer and cross-linking agent on one surface thereof is withdrawn from the solution at a determined rate, said rate also being dependent upon the thickness of the thin film which is desired. The withdrawal rate may range from about 0.25 to about 1.5 cm/sec. (0.5 to 3 ft/min.) and will depend, as hereinbefore set forth, on the thickness of the film which is desired as well as the particular type of prepolymer which is used to prepare the semi-permeable membrane. After withdrawal from the solution the coated finely porous support material is polymerized usually by treatment with heat at a temperature ranging from about 50° to about 150° C. for a period of time which may range from about 0.5 up to about 10 hours or more in duration, said heat treatment rendering the polymerized film insoluble in the solvent which is employed.

It is also contemplated within the scope of this invention that the molecular weight of the prepolymer may be increased by a prepolymerization step prior to being utilized to coat the finely porous support member. The prepolymerization reaction is effected by treating said prepolymer with a minimal amount of a catalyst or curing agent such as dibutyl tin laureate, organo peroxides such as benzoyl peroxide, t-butyl peroxide, etc., and thereafter heating the prepolymer at a controlled temperature which may range from about 90° to about 120° C. for a predetermined period of time which may range from about 1 to about 3 hours. The prepolymerization of the prepolymer to increase the molecular weight thereof will be such that the molecular weight is increased to such a point whereby the prepolymer will still remain soluble in the halogenated hydrocarbon solvent which is employed. By effecting this prepolymerization of the prepolymer prior to coating the finely porous support member followed by cross-linking or final polymerization at an elevated temperature, it is possible to prevent the prepolymer from passing into or plugging up the pores of the finely porous support member. In addition, it is also possible to obtain a smoother and more uniform thickness of the semi-permeable membrane which is coated on the porous support member.

The thus formed membrane may be used as such or, if so desired, it may be subjected to additional treatment. The additional treatment which may be employed will consist in treating the film with an additional amount of halogenated hydrocarbon solvent whereby the pores of the support which may contain some unpolymerized prepolymer will become soluble in the solvent and removed, thus increasing the permeability of the membrane without impairing the selectivity thereof. It is also contemplated within the scope of this invention that after subjecting the gas membrane to the cross-linking step of the process a second thin film may be formed on the surface of the cross-linked or polymerized film by passage of the membrane through the solution containing the prepolymer for a second time followed by a second heat treatment to cross-link and form a second thin film on the surface of the first thin film. This formation of the second film will remove or eliminate any imperfection which may have been present in the first film.

By utilizing various semi-permeable membrane forming prepolymers as the thin film component of the gas membrane of the present invention, it is possible to effect various gas separations inasmuch as the various polymers which are formed as a thin film possess varying permeabilities with regard to specific gases. For example, the permeability of oxygen in various polymers is set forth in the following table.

TABLE I

| Polymer | Permeability* |
| --- | --- |
| Dimethyl Silicone Rubber | 50.0 |
| Silicone Polycarbonate Copolymer | 16.0 |
| Polybutadiene | 13.0 |
| Natural Rubber | 2.4 |
| Polyethylene, High Density | 0.1 |
| Cellulose Acetate | 0.08 |
| Nylon 6 | 0.004 |
| Teflon | 0.0004 |

*Permeability = $P \times 10^9 \left[ \frac{Cm^3 \text{ Gas (STP), Cm}}{Cm^2, \text{ Sec, Cm-Hg}} \right]$ From a study of the above table it is therefore apparent that when utilizing dimethyl silicone as the prepolymer which forms the thin film it is possible to obtain a relatively high transport of oxygen whereas by utilizing nylon 6 or Teflon as the polymer a relatively low transport of oxygen would occur. A dimethyl silicone polymer itself possesses varying permeabilities and selectivities for binary gas mixtures, examples of which are given in the following table.

TABLE II

| Gas Pair | Permeability | Selectivity |
| --- | --- | --- |
| $O_2/N_2$ | 50/25 | 2.0 |
| $CH_4/He$ | 80/30 | 2.7 |
| $CO_2/CH_4$ | 270/80 | 3.4 |
| $CO_2/H_2$ | 270/55 | 4.9 |
| $H_2O/NH_3$ | 3000/500 | 6.0 |
| $CO_2/CO$ | 270/30 | 9.0 |
| $NO_2/NO$ | 635/50 | 12.7 |
| $CS_2/N_2O$ | 7500/365 | 20.6 |
| $H_2S/CO$ | 840/30 | 28.0 |
| $SO_2/N_2$ | 1250/25 | 50.0 |

Therefore, by utilizing dimethyl silicone as the semi-permeable forming prepolymer, it is possible to effect selective separations for specific mixtures of gases.

The gas membranes of the present invention which have been prepared according to the process herein described may be used in any separation device known in the art. For example, the devices may be used in either single stage or multi-stage membrane plants. One type of configuration in which the gas membrane may be used would comprise a spiral wound element. In this type of element two sheets of semi-permeable membrane are separated by a porous supporting material which both supports the membrane against the operating pressure and provides a flow path for the gaseous output. The membranes are sealed around three edges or sides to prevent contamination of the product gases while the fourth edge or side is sealed to the product tube. The product tube is provided with perforations inside the edge seal area in order that the product gases can be removed from the porous support material. The resulting configuration is in the form of an envelope which is rolled up about the central tube in the form of a spiral along with a mesh spacer which separates the facing surface membranes. By utilizing such a type of element, it is possible to take advantage of a number of factors which include, among others, a large membrane surface area per unit volume and a convenient and simple pressure vessel design and configuration, which in turn will lead to a compact module plant arrangement, flexibility and ease in installation and in replacement of the elements inasmuch as the modules may comprise two or several disposable units connected in series.

As was hereinbefore set forth by utilizing the process of the present invention, it is possible to obtain a membrane in which the thin film which is composited on the porous support is not formed in a series of monomolecular layers, nor are the molecules oriented or closely packed, the polymer chains being intertwined and loosely arranged so as to form an amorphous film. As a result of this method of preparing finished membrane the thin film membrane is formed on the surface of the porous support member directly from solution and is integrally bonded to the support membrane, thus permitting a high gas permeation through the membrane. In contradistinction to the membranes which were found in prior U.S. patents, the membrane prepared according to the process of this invention does not require multiple, thin film layers in order to attain the desired thickness. The semi-permeable membrane forming prepolymers which are utilized in the present invention per se possess a molecular weight which is sufficient to prevent the material from penetrating the pores on the surface of the porous support or may be prepolymerized to form a prepolymer which possesses the desired molecular weight, a specific example of this being high molecular weight dimethyl silicone polymers. Furthermore, the gas separation membranes which are formed according to the process of the present invention, due to the integral bonding of the thin film membrane to the porous support, will withstand any back pressure which may be encountered during the gas separation process.

The following examples are given to illustrate the process of the present invention for producing gas separation membranes. However, it is to be understood that these examples are given merely for purposes of illustration, and that the present invention is not necessarily limited thereto.

EXAMPLE I

A finely porous cellulose nitrate/cellulose acetate porous support membrane which is used in the preparation of a membrane for the separation of gases was prepared from a casting solution containing 7.8 wt. % of cellulose nitrate, 1.3 wt. % of cellulose acetate, 53.7 wt. % of acetone, 20.4 wt. % of absolute alcohol, 26.6 wt. % butanol, 3.8 wt. % glycerin and 0.5 wt. % of a surfactant, Triton X-100. When preparing the solution two separate acetone solutions of cellulose nitrate and cellulose acetate were prepared and blended into a third solution comprising a diluent mixture consisting of 55.8 parts of ethanol, 36.2 parts of n-butanol, 3.5 parts of water, 3.5 parts of glycerin and 1.1 part of Triton X-100. The cellulose nitrate and cellulose acetate stock diluents were blended with a high speed stirrer. At this point the polymers were incompatible but a clear solution was obtained when the diluent solution was added; the Brookfield viscosity of the final casting solution being 700 cps at 25° C. The solution was then pressure filtered through a 5 micron polypropylene filter at an applied nitrogen pressure of 20 psi in order to remove any foreign material and gel particles which were present. The solution was then degassed in order to remove dissolved nitrogen by applying a slight vacuum to the flask for a period of several minutes. Following this the solution was placed in a separatory funnel equipped with a water cooled condenser and the flask was immersed in a constant temperature bath of 40° C. for a period ranging from 3–4 hours.

The flask was withdrawn from the bath and mounted above and directed into the casting knife reservoir of a continuous casting machine. The solution was fed from the separatory funnel through a regulating stopcock at the same rate at which the solution was spread onto a stainless steel casting belt. The solution was spread onto the belt at a thickness of 750 microns at a rate of 25 cm/min. The belt was led into the first gelation chamber in which a flow of humid air was maintained at a rate of 15 ft$^3$/min. while maintaining the temperature of the chamber at about 36° C., the temperature of the belt being controlled by a recirculating water bed located directly below the belt. Following this the belt was led into a second gelation chamber which is maintained at a temperature of 45° C. to promote the removal of the solvent. After passage through the second gelation chamber the belt was passed over an elevated temperature zone to remove any remaining solvent. The resulting finely porous cellulose nitrate-cellulose acetate support member or membrane was removed from the casting belt and rolled upon itself on storage rollers. The membrane rolls were then sealed in polyethylene tubes and stored under refrigeration until it was ready for use as the support member upon which a semipermeable thin film membrane was to be cast. The dry membrane, the bulk of which contained fine interconnected pores, was approximately 100 microns thick. The bulk porosity, as determined from density measurements was 70–80%, the membrane or member being asymmetric with a finely porous 400 Angstrom skin on the air dried surface. The membrane was analyzed and from electron micrographs it was determined that the surface was 20–25% porous and contained between 60–70 pores per square micron. The diameter of the majority of the pores being less than 400 Angstroms.

To form the final membrane for the separation of gases, one surface of the finely porous support member prepared according to the above paragraphs was treated by passage through a halogenated hydrocarbon solvent comprising trifluorotrichloroethane containing 1.5 wt. % of a prepolymer comprising dimethyl silicone and 0.15% by weight of a cross-linking catalyst comprising dibutyl tin laureate. The porous support material was passed through the solution at ambient temperature and atmospheric pressure and after passage through the solution was drawn from the same at a withdrawal rate of 1.0 cm/sec. Following this the thin semi-permeable membrane film was cross-linked by being treated at a temperature of 100° C. for a period of time ranging from about 0.5 to 4 hours, the elevated temperature being supplied by radiant tube heaters. The final gas separation membrane comprised a thin film of dimethyl silicone polymer having a thickness of 5000 Angstroms composited on the cellulose nitrate-cellulose acetate finely divided support.

To illustrate the efficiency of a membrane useful for the separation of gases, the thin film dimethyl silicone polymer which was composited on the finely porous surface of the cellulose nitrate-cellulose acetate support member prepared according to the above paragraphs was used in a single stage gas separation process. A feed stream comprising air was passed over the surface of this membrane at a pressure of 150 psi at 25° C. The membrane exhibited a higher permeability to oxygen than to nitrogen and the permeate stream which passed through the membrane was enriched in oxygen while the residue stream which consisted of the remainder of the unpermeated feed was enriched in nitrogen. When utilizing this 2 inch diameter spiral wound element, which was fabricated from the dimethyl silicone thin film composite membrane, it was possible to attain oxygen enrichments of the permeate stream to as high as 35%.

As hereinbefore set forth the efficiency of combustion processes using oxygen enriched air can be improved by increasing the effective heating value of fossil fuel oxidant mixtures. The principal advantage of increasing this heating value would be a higher combustion temperature and therefore a theoretical increase in thermal efficiency in the utilization of energy released during the combustion. For example, as the oxygen concentration of air is increased from the normal 21% to 100%, the energy density of the combined reactants increases about 250%, that is, from 95 BTU/ft$^3$ to 333 BTU/ft$^3$.

EXAMPLE II

In this example a cellulose nitrate-cellulose acetate finely porous support member was prepared in a manner similar to that set forth in Example I above. The support member was then passed through a trifluorotrichloroethane solution containing 1.5% by weight of dimethyl silicone prepolymer and 0.15% by weight of a cross-linking agent comprising dibutyl tin laureate. After passage through the solution at ambient temperature and atmospheric pressure, the support member was withdrawn at a rate of 1 cm/sec. Thereafter the dimethyl silicone prepolymer was cross-linked by treatment at a temperature of 100° C. for a period of 0.25 hours. The thickness of the thin film dimethyl silicone polymer on the surface of the porous support member was found to be about 5000 Angstroms.

EXAMPLE III

In this example a different finely porous support member was prepared by casting a solution containing 15 wt. % of polysulfone, 12.5 wt. % of methyl cellusolve and 1 wt. % of 2,4-diamino-6-phenyl-s-triazine on a tightly woven dacron fabric. Immediately after casting, the support member was gelled in distilled water, rinsed thoroughly to remove the solvent and dried. This support member was then used in forming the gas separation membrane by passing the support member through a trifluorotrichloroethane solvent containing 1.5 wt. % of dimethyl silicone and 0.15 wt. % of a cross-linking agent comprising dibutyl tin laureate. The support member was passed through said solution at ambient temperature and atmospheric pressure and was withdrawn at a rate of 4 cm/sec. Thereafter the dimethyl silicone was cross-linked by treatment at a temperature of 120° C. for a period of 0.25 hour to form a thin film polymer integrally bonded to the support member, said thin film polymer having a thickness of 5000 Angstroms.

We claim as our invention:

1. A process for the production of a membrane for the separation of gases which comprises forming a thin film of a non-porous semi-permeable membrane selectively permeable to glass having a thickness in the range of from about 250 Angstroms to about 10,000 Angstroms directly on the surface of a porous support member by passing one finely porous surface of said porous support member through a solution of a halogenated hydrocarbon solvent containing a semi-permeable membrane forming prepolymer and a cross-linking agent, withdrawing the coated porous support member from said solution, and thereafter cross-linking said prepolymer by treatment at an elevated temperature to form the resultant membrane comprising said porous support member coated with a thin film of a semi-permeable membrane.

2. The process as set forth in claim 1 in which said elevated temperature is in a range of from about 50° to about 150° C.

3. The process as set forth in claim 1 in which said halogenated hydrocarbon solvent is trifluorotrichloroethane.

4. The process as set forth in claim 1 in which said prepolymer is dimethyl silicone.

5. The process as set forth in claim 1 in which said prepolymer is a silicone-carbonate copolymer.

6. The process as set forth in claim 1 in which said prepolymer is styrene.

7. The process as set forth in claim 1 in which said porous support member is a cellulose nitrate-cellulose acetate membrane.

8. The process as set forth in claim 1 in which said porous support member is a polysulfone membrane.

9. The process as set forth in claim 1 in which said membrane is treated with a halogenated hydrocarbon solvent subsequent to said cross-linking step to increase the permeability thereof.

10. The process as set forth in claim 9 in which said solvent is trifluorotrichloroethane.

11. The process as set forth in claim 1 in which said polymer chains resulting from said cross-linking step form an amorphous film.

* * * * *

UNITED STATES PATENT AND TRADEMARK OFFICE
CERTIFICATE OF CORRECTION

PATENT NO. : 4,243,701
DATED : January 6, 1981
INVENTOR(S) : Robert L. Riley et al It is certified that error appears in the above-identified patent and that said Letters Patent are hereby corrected as shown below:

Claim 1 should read:

1. A process for the production of a membrane for the separation of gases which comprises forming a thin film of a nonporous semi-permeable membrane selectively permeable to gases having a thickness in the range of from about 250 Angstroms to about 10,000 Angstroms directly on the surface of a porous support member by passing one finely porous surface of said porous support member through a solution of a halogenated hydrocarbon solvent containing a semi-permeable membrane forming pre-polymer and a cross-linking agent, withdrawing the coated porous support member from said solution, and thereafter cross-linking said pre-polymer by treatment at an elevated temperature to form the resultant membrane comprising said porous support member coated with a thin film of a semi-permeable membrane.

Signed and Sealed this

Twenty-fourth Day of March 1981

[SEAL]

Attest:

RENE D. TEGTMEYER

Attesting Officer

Acting Commissioner of Patents and Trademarks